United States Patent
Sotiriades

(10) Patent No.: US 8,360,027 B2
(45) Date of Patent: Jan. 29, 2013

(54) FUEL TANK SYSTEM AND RELATED METHOD OF ASSEMBLY

(75) Inventor: Aleko D. Sotiriades, Cedarburg, WI (US)

(73) Assignee: Kohler Co., Kohler, WI (US)

( * ) Notice: Subject to any disclaimer, the term of this patent is extended or adjusted under 35 U.S.C. 154(b) by 666 days.

(21) Appl. No.: 12/582,011

(22) Filed: Oct. 20, 2009

(65) Prior Publication Data
US 2010/0095925 A1    Apr. 22, 2010

Related U.S. Application Data

(60) Provisional application No. 61/107,248, filed on Oct. 21, 2008.

(51) Int. Cl.
*F02B 67/00* (2006.01)

(52) U.S. Cl. ............ 123/195 A; 123/195 C; 123/195 R; 220/4.14

(58) Field of Classification Search .............. 123/195 R, 123/195 A, 195 C, 198 E; 220/4.14, 4.17, 220/4.33, 4.34
See application file for complete search history.

(56) References Cited

U.S. PATENT DOCUMENTS

| | | | | |
|---|---|---|---|---|
| 6,123,216 | A * | 9/2000 | Yokocho et al. | 220/564 |
| 2008/0142524 | A1* | 6/2008 | Thomas et al. | 220/562 |

FOREIGN PATENT DOCUMENTS

| | | |
|---|---|---|
| DE | 19605702 A1 * | 8/1997 |
| DE | 102005033661 A1 | 1/2007 |
| JP | 10033038 A | 10/1998 |
| JP | 2002021576 A | 1/2002 |

OTHER PUBLICATIONS

International Appln No. PCT/US2008/005713; Notification of Transmittal of the International Search Report and the Written Opinion of the International Searching Authority; dated Jan. 14, 2010; 12 pages.
PCT—Notification Concerning Transmittal of International Preliminary Report on Patentability (Chapter I of the Patent Cooperation Treaty); dated May 5, 2011; 7 pages.

* cited by examiner

*Primary Examiner* — Noah Kamen
*Assistant Examiner* — Hung Q Nguyen
(74) *Attorney, Agent, or Firm* — Whyte Hirschboeck Dudek S.C.

(57) ABSTRACT

A fuel tank system, engine employing such a system, and related method of assembly are disclosed. In at least one embodiment, the fuel tank system includes a fuel tank, a mounting bracket, and at least three fastening devices. The tank includes an outer wall that defines an internal cavity, and first and second channels extending between first and second opposed outer surfaces of the wall through the cavity. The bracket has first and second protrusions, where the first and second protrusions respectively extend into the first and second channels, respectively. First and second ones of the fastening devices are respectively fastened to the first and second protrusions, respectively, so as to prevent movement of the protrusions out of the channels, thereby securing the bracket to the tank. A third of the fastening devices allows the bracket to be secured to another engine component.

20 Claims, 4 Drawing Sheets

FUEL TANK SYSTEM AND RELATED METHOD OF ASSEMBLY

CROSS-REFERENCE TO RELATED APPLICATIONS

This application claims the benefit of U.S. provisional patent application No. 61/107,248 entitled "Fuel Tank System and Related Method of Assembly" filed on Oct. 21, 2008, which is hereby incorporated by reference herein.

STATEMENT REGARDING FEDERALLY SPONSORED RESEARCH OR DEVELOPMENT

Field of the Invention

The present invention relates to internal combustion engines and, more particularly, to fuel tanks and related components implemented on (or in conjunction with) such engines and/or systems and methods for mounting such fuel tanks and related components upon (or as part of) such engines.

BACKGROUND OF THE INVENTION

Internal combustion engines include or operate in conjunction with fuel tanks that store gasoline, diesel fuel, biofuels or other fuels prior to their consumption by the engines. A variety of different types of fuel tanks and methods of coupling/integrating those fuel tanks with internal combustion engines are known in the art. At least some conventional internal combustion engines employ plastic fuel tanks. In some such embodiments, the plastic fuel tank includes a boss feature molded into the plastic fuel tank that allows a fastening screw extending from the remainder of the engine (e.g., from the engine crankcase) to thread directly into the fuel tank body, thereby allowing direct fastening of the fuel tank to the remainder of the engine.

Notwithstanding the common usage of this type of design, there are at least two disadvantages with such a design. First, during factory assembly or field service of an engine employing such a configuration, it is possible that an improper screw may be threaded into the fuel tank boss. The fuel tank is then at risk from cracking and leaking if the screw diameter is too large or at risk from puncture and leakage if the screw is too long. Additionally, such a conventional design can risk cracking of the fuel tank due to fatigue experienced over time. In particular, forming the screw boss feature on the fuel tank can create an irregular wall thickness. When exposed to various types of stresses over time, particularly stresses associated with exposure of the fuel tank to fuel chemicals and various environmental effects including variations in the temperature to which the fuel tank is exposed, it is possible that the fuel tank may crack and begin to leak fuel. This situation can be exacerbated by material deformation of the screw.

At least some conventional plastic fuel tanks are manufactured via a blow-molding process. Although blow-molding is a useful process for manufacturing components such as fuel tanks, it is especially difficult to create detailed features such as bosses using this process. Consequently, with respect to blow-molded fuel tanks, other methods have often been used to constrain and mount fuel tanks, such as clamping of external web-sections. While such methods can avoid direct impregnation of the fuel tanks by fastening screws, such methods often involve extra cost burdens, for example, those associated with the use of additional clamping materials and the additional assembly time required to manufacture such fuel tank assemblies.

For at least these reasons, therefore, it would be advantageous if an improved fuel tank system and/or method of assembling fuel tanks to internal combustion engines could be developed. More particularly, it would be advantageous if, in at least some embodiments, the risk that portion(s) of the fuel tank and/or mounting component(s) allowing for the fuel tank to be fastened to the remainder of an internal combustion engine might result in damage to the fuel tank was reduced by comparison with conventional fuel tank systems. Additionally, it would be advantageous if, in at least some embodiments, advantage(s) associated with manufacturing a fuel tank by way of a blow-molding process could be achieved without incurring one or more of the constraints faced when implementing blow-molded fuel tanks in conventional engines.

BRIEF SUMMARY OF THE INVENTION

In at least some embodiments, the present invention relates to a fuel tank system that includes a fuel tank, a first mounting bracket, first and second fastening devices, and at least one additional fastening device by which the mounting bracket is capable of being secured to another engine component. The fuel tank includes an outer wall that defines an internal cavity, an input orifice by which fuel can be added to the fuel tank, and first and second channels extending between first and second opposed outer surfaces of the wall through the cavity. The first mounting bracket has first and second protrusions, where a first surface of the mounting bracket is positioned proximate the first opposed outer surface of the fuel tank, and where the first and second protrusions respectively extend into the first and second channels. The first and second fastening devices are positioned proximate the second opposed outer surface of the fuel tank and are respectively fastened to the first and second protrusions, respectively, so as to prevent movement of the first and second protrusions out of the first and second channels, thereby securing the mounting bracket to the fuel tank.

Additionally, in at least some embodiments, the present invention relates to a method of assembling a fuel tank to another component of an internal combustion engine. The method includes assembling a first mounting bracket to one of the fuel tank and the other component, and assembling the first mounting bracket to the other of the fuel tank and the other component. The assembling of the first mounting bracket to the fuel tank includes inserting first and second protrusions of the first mounting bracket into first and second complementary holes extending through the fuel tank from a first opposed outer surface of the fuel tank to a second opposed outer surface of the fuel tank, thereby extending through a cavity formed within the fuel tank, where a main body of the first mounting bracket is positioned along the first opposed outer surface of the fuel tank. The assembling of the first mounting bracket to the fuel tank additionally includes affixing at least one fastening device to the first and second protrusions proximate the second opposed outer surface of the fuel tank, whereby the first mounting bracket is thereby assembled to the fuel tank.

Further, in at least some embodiments, the present invention relates to an internal combustion engine. The engine includes a crankcase, and a fuel tank including an outer wall that defines an internal cavity and first and second channels extending between first and second opposed outer surfaces of the wall through the cavity. The engine further includes a plurality of mounting components by which the fuel tank is assembled to the crankcase. The mounting components include a first mounting bracket having first and second protrusions, where the first and second protrusions respectively extend into the first and second channels, respectively. The mounting components also include first, second and third fastening devices, where the first and second fastening devices are respectively fastened to the first and second protrusions, respectively, so as to prevent movement of the first and second protrusions out of the first and second channels, and where the third fastening device secures the mounting bracket at least indirectly to the crankcase.

DETAILED DESCRIPTION OF THE PREFERRED EMBODIMENT

Figure 1:
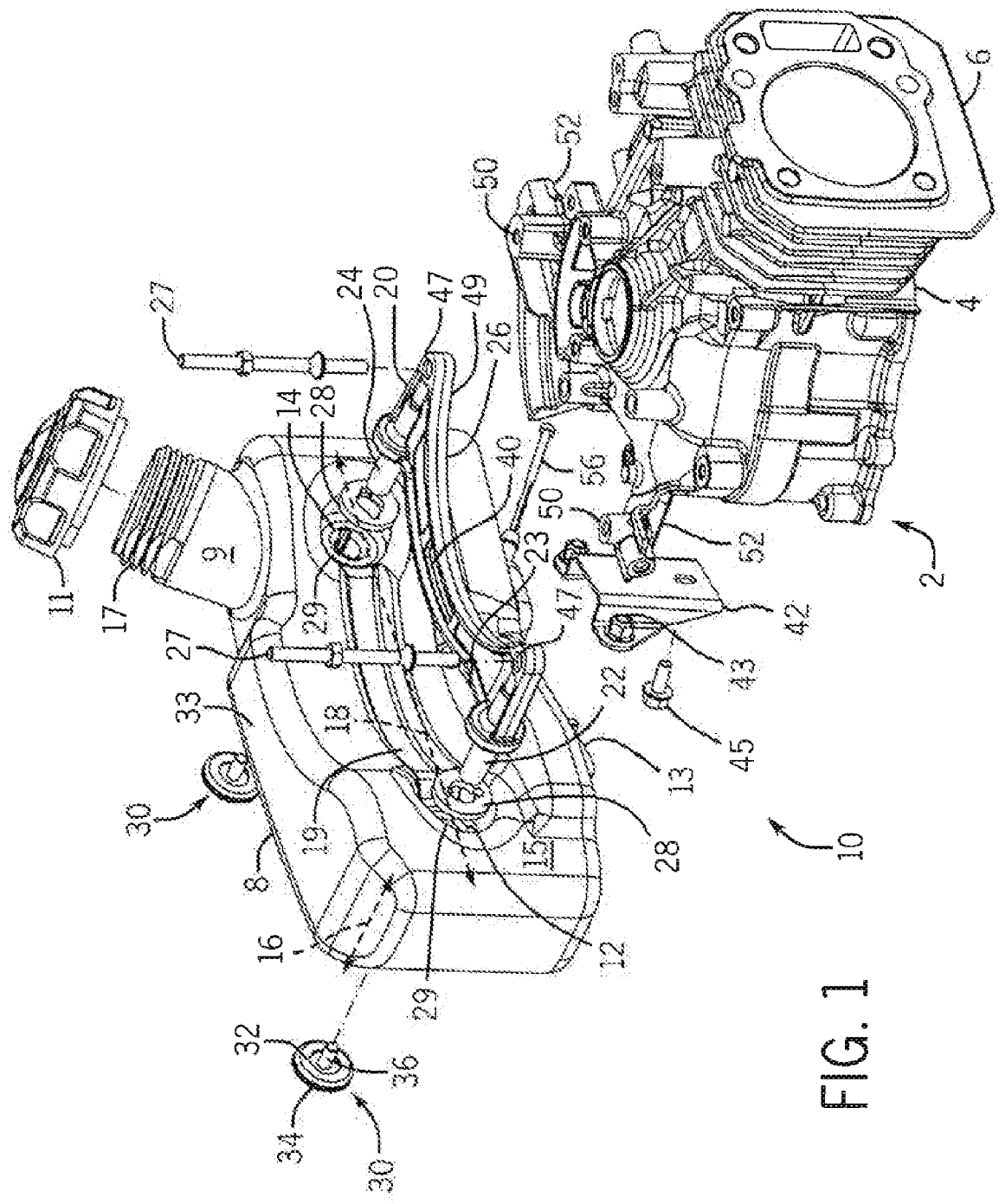
FIG. 1 is an exploded, front perspective view of an engine assembly including, among other components, a fuel tank and mounting assembly components employed to secure the fuel tank to other portion(s) of the engine assembly.
Figure 2:
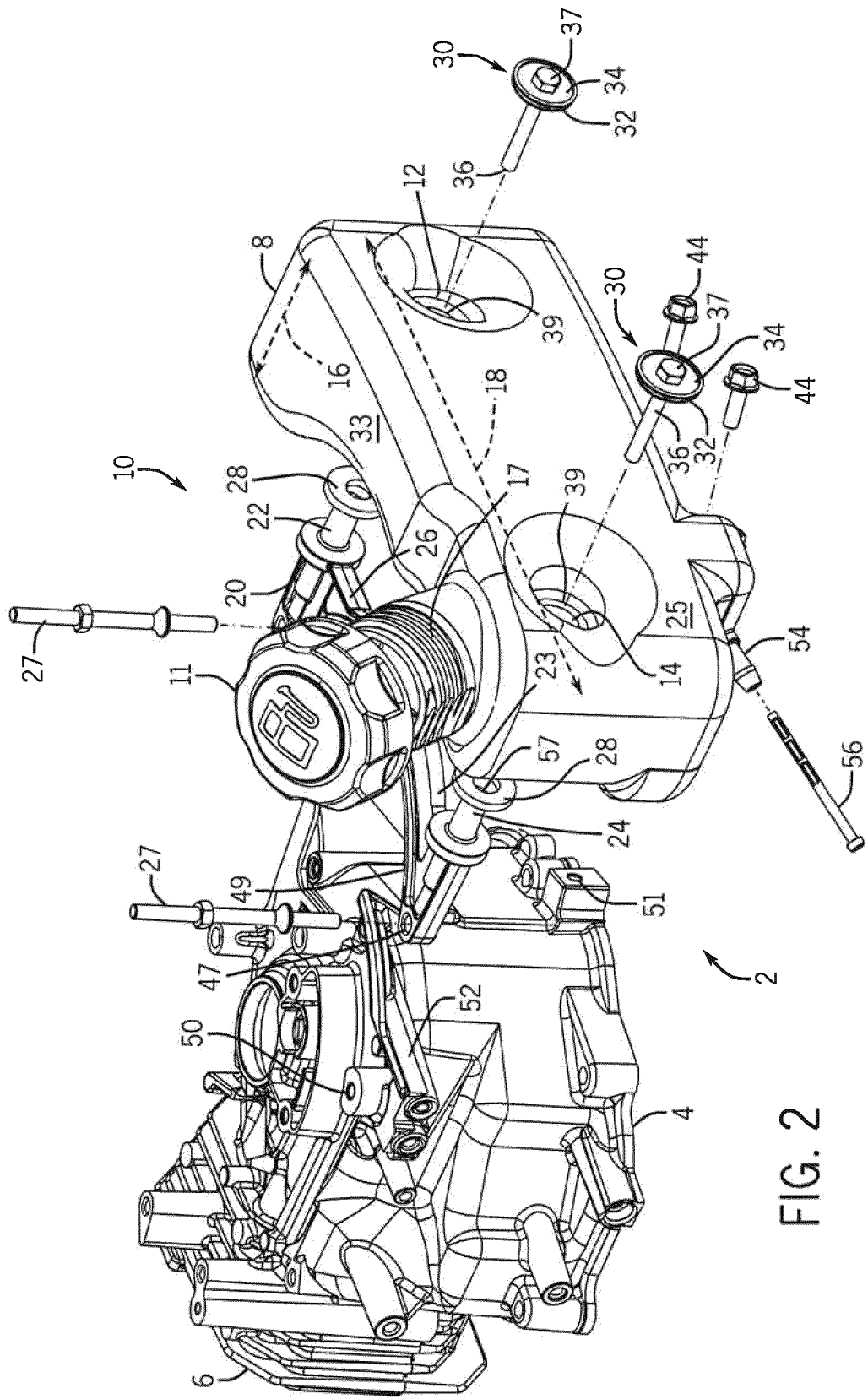
FIG. 2 is an additional exploded, rear perspective view of the engine assembly of FIG. 1.

Referring to FIGS. 1 and 2, two exploded views are provided of portions of an exemplary engine assembly 2 that, in the present embodiment, can be implemented in (or as part of) a single-cylinder, vertical crankshaft internal combustion engine. Although other portions of such an engine, such as a crankshaft, are not shown in FIGS. 1 and 2, it will be understood that such an engine will nevertheless typically include one or more such additional portions when fully assembled. As shown, the engine assembly 2 in particular includes a crankcase 4 including a cylinder 6 configured to receive a piston (not shown), as well as a fuel tank 8 and mounting assembly components 10 that allow the fuel tank 8 to be assembled to the crankcase 4. Although in the present embodiment the engine assembly 2 is for use in a single cylinder, vertical crankshaft engine, other embodiments of the present invention can encompass or relate to engine assemblies for use in other types of internal combustion engines, including for example multi-cylinder engines and/or horizontal crankshaft engines.

Figure 3:
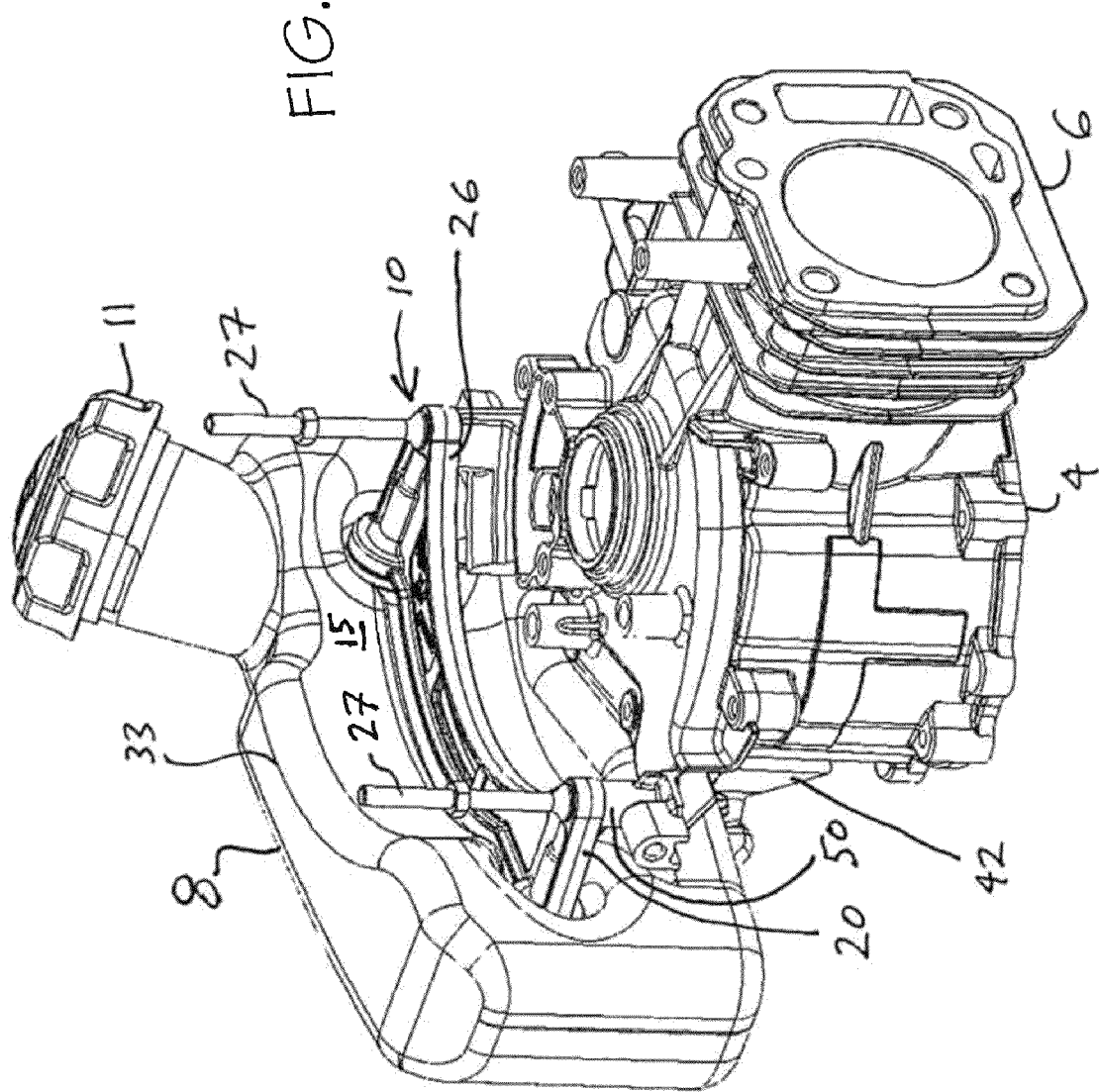
FIG. 3 is a further, unexploded front perspective view of the engine assembly of FIGS. 1-2.
Figure 4:
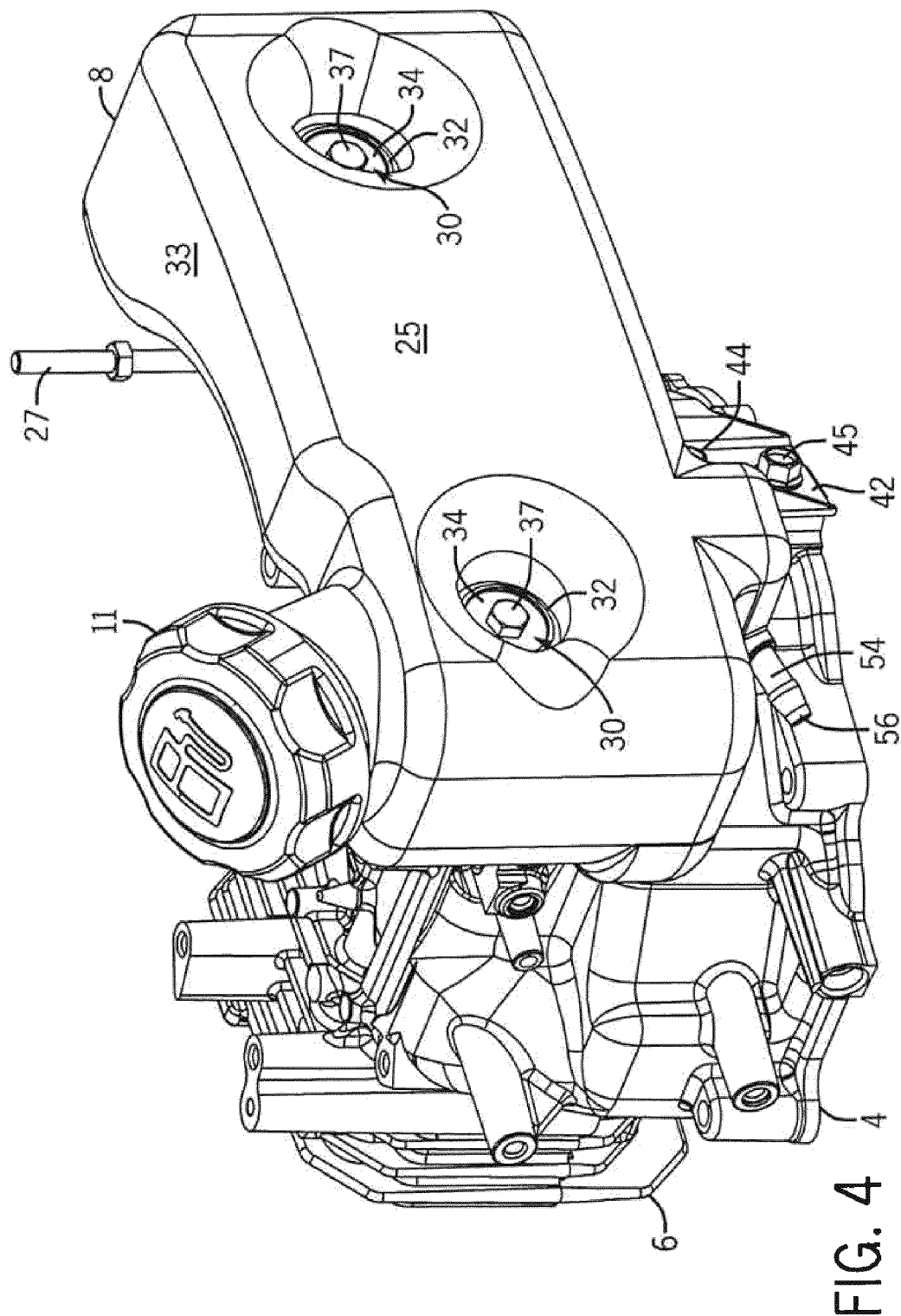
FIG. 4 is a further, unexploded rear perspective view of the engine assembly of FIGS. 1-3.

Referring additionally to FIGS. 3 and 4, two additional views of the engine assembly 2 of FIGS. 1 and 2 are provided in which the fuel tank 8 is shown to be assembled to the crankcase 4 by way of the mounting assembly components 10, that is, where the engine assembly is no longer shown to be exploded but rather is shown to be assembled. More particularly, FIG. 3 provides a front view of the engine assembly 2 corresponding to the orientation illustrated in FIG. 1, while FIG. 4 provides a rear view of the engine assembly corresponding to the orientation illustrated in FIG. 2. Although the description provided below primarily relates to FIGS. 1 and 2 insofar as the exploded views of FIGS. 1 and 2 make visible in more detail a number of the components of the engine assembly 2, it should be remembered that the same engine assembly 2 shown in FIGS. 1 and 2 is also shown in FIGS. 3 and 4.

In the present embodiment, the fuel tank 8 is a blow-molded plastic structure manufactured using high density polyethylene, although in alternate embodiments the fuel tank can be manufactured using other plastic materials or other materials and by way of other manufacturing processes. For example, in at least some other embodiments, the fuel tank can be manufactured by way of injection molding, twin sheet hot forming (or vacuum forming), or welding. The structure of the fuel tank is a wall (or multiple integrally-formed walls) that defines an interior cavity within which fuel can be contained. In the present embodiment, the fuel tank 8 is configured to have an arched ceiling portion 33, within which air/fuel vapors collect when the fuel tank is otherwise filled with fuel, and which accommodates pressure changes due to expansion/contraction accompanying temperature changes.

As shown, the fuel tank 8 also has a fuel tank neck 9 defining an orifice by which fuel can be provided into the tank, and also includes a fuel tank cap 11 that is used to close off the orifice once fuel has been added to the tank. The fuel tank cap 11 can be provided with any of a variety of features that allow fuel vapors to exit the fuel tank 8 to the outside atmosphere, or so that fuel vapors are absorbed in a carbon canister or the like. The fuel tank cap 11 can also be shaped/formed/molded in a variety of manners depending upon the embodiment to allow for the fuel tank cap to be coupled to the fuel tank neck 9 in various ways. For example, in one embodiment, the fuel tank cap 11 is molded to include threads that are complementary with respect to threads 17 formed on the fuel tank neck 9. Also for example, in other embodiments the fuel tank cap 11 is formed to include "quarter turn" or "quick turn" features allowing for the fuel tank cap to be locked to the fuel tank neck by way of only a quarter-turn (or other small amount of rotation) by the cap relative to the neck.

In addition to the fuel tank neck and cap 9, 11, the fuel tank 8 also has first and second tapered holes or channels (or tubes) 12, 14 extending through a width of the tank as illustrated by a width dimension arrow 16, and that are respectively located near opposite ends of a length of the tank as illustrated by a length dimension arrow 18. In the present embodiment, the tapered holes 12, 14 extend completely through the fuel tank 8 between opposed outer surfaces of the fuel tank wall, more particularly, between an inboard outer surface 15 (see FIG. 1) and an outboard outer surface 25 (see FIG. 2) that are opposed to one another, and thus the tapered holes 12, 14 extend completely through the internal cavity of the fuel tank. As illustrated, the tapered holes 12, 14 are tubular with walls that extend internally within the fuel tank 8 between the surfaces 15, 25 and that effectively constitute internal extensions of the wall of the fuel tank 8, and the presence of the tapered holes does not create any breach in the integrity of the internal storage cavity of the fuel tank 8 by which fuel stored within the fuel tank might escape from the fuel tank. Thus, the tapered holes 12, 14 add significantly to the structural strength of the body of the fuel tank 8.

In addition to the tapered holes 12, 14, the fuel tank 8 also has two additional holes 13 (one of which is visible in FIG. 1) along its underside, that is, located below the tapered holes 12, 14. The additional holes 13, unlike the tapered holes 12, 14, do not extend through the cavity defined by the fuel tank 8, but rather are formed in a web surface extending from the main body of the fuel tank along the underside of the fuel tank.

The mounting assembly components 10 include an upper fuel tank mounting bracket 20 that in the present embodiment is molded from die-cast aluminum or injection molded thermoplastic plastic, although in alternate embodiments the bracket can be manufactured from other materials or by way of other processes. The upper fuel tank mounting bracket 20 includes first and second tapered protrusions or posts 22 and 24 that are connected to one another by way of a primary bracket portion 26, and that extend outward away from the primary bracket portion from a fuel tank side 23 of the mounting bracket. The taper angle of the tapered posts 22, 24 matches that of the tapered holes 12, 14 of the fuel tank 8. In each case, the thickness (e.g., the diameter) of the posts/holes decreases as one proceeds away from the primary bracket portion 26.

When the upper fuel tank mounting bracket 20 is mounted to the fuel tank 8, the first and second tapered posts 22 and 24 respectively extend through the first and second tapered holes 12 and 14, respectively, such that the tapered posts extend through the width of the fuel tank parallel to the width dimension arrow 16. Additionally, when so mounted, the primary bracket portion 26 of the upper fuel tank mounting bracket 20 extends along the length of the fuel tank generally parallel to the length dimension arrow 18. In the present embodiment, the fuel tank side 23 of the upper fuel tank mounting bracket 20 has a convex shape and the inboard surface of the fuel tank 8 has a complementary concave groove 19 extending generally between the tapered holes 12, 14, into which the fuel tank side of the mounting bracket fits. In other embodiments, the upper fuel tank mounting bracket 20 and fuel tank 8 can have other shapes and take other forms.

The fuel tank 8 is secured to the upper fuel tank mounting bracket 20 by way of mounting assembly components 10 as follows. In particular, the fuel tank 8 is positioned onto the tapered posts 22, 24 of the upper fuel tank mounting bracket 20, such that the tapered posts respectively extend through the tapered holes 12, 14, respectively. The tapered posts 22, 24 additionally extend through respective rubberized grommets 28 that are positioned along the inboard side of the fuel tank 8, and that fit within pockets/eyelet cavities 29 (see FIG. 1) along the inboard ends of the tapered holes 12, 14 of the fuel tank 8. When the tapered posts 22, 24 are fully inserted into the tapered holes 12, 14 (as shown in additional FIG. 4 discussed further below), the rubberized grommets 28 are sandwiched between the inboard outer surface 15 of the fuel tank 8 and the inboard ends of the tapered posts 22, 24 (that is, the ends of the tapered posts that are closer to the primary bracket portion 26). Depending upon the embodiment, the rubberized material making up the grommets 28 can range from rubber to any of a variety of other materials having properties similar to those of rubber.

Once the tapered posts 22, 24 are positioned in this manner relative to the tapered holes 12, 14, respective bolt assemblies 30 are assembled to the respective outboard edges of the respective tapered posts (that is, the ends of the tapered posts that are farther from the primary bracket portion 26). Each of the bolt assemblies 30 more particularly includes a respective plastic washer 32, a respective metal back-up washer 34 and a respective retaining bolt 36 with a respective head 37 (see FIG. 2). The plastic washers 32 fit within pockets/eyelet cavities 39 at the respective outboard ends of the tapered holes 12, 14 of the fuel tank 8. The plastic washers 32 are typically made from a plastic material having material properties similar to those of the fuel tank 8, so as to eliminate or at least reduce any abrasion or wear that might occur due to the contact between the washers and the fuel tank. The respective bolts 36 are screwed into complementary threaded holes 57 (one of which is shown in FIG. 2) formed within the tapered posts 22, 24, such that the bolts are affixed to the posts with the plastic washers 32 and metal back-up washers 34 being sandwiched between the outboard side of the fuel tank 8 and the respective heads 37 of the respective bolts (the metal back-up washers being between the heads and the plastic washers).

With respect to fastening the upper fuel tank mounting bracket 20 to the crankcase 4, the mounting assembly components 10 additionally include two bolts 27 that are respectively inserted through two orifices 47 positioned at opposite ends of the primary bracket portion 26 along a crankcase side 49 of the mounting bracket opposite the fuel tank side 23 from which the tapered posts 22, 24 extend. As shown, the orifices 47 are configured so that central axes of the orifices are substantially perpendicular to each of the width and length dimensions of the fuel tank as represented by the width dimension arrow 16 and length dimension arrow 18 (e.g., in the present embodiment, substantially vertical). The orifices 47 are aligned with threaded receiving orifices 50 formed along the crankcase 4 (particularly within extensions 52 of the crankcase). Following passage of the bolts through the orifices 47, the bolts enter the receiving orifices 50 and, upon appropriate rotation, the bolts are secured to the crankcase 4, thus resulting in the securing of the upper fuel tank mounting bracket 20 and the fuel tank 8 to the crankcase as well.

In addition to the components already described above, the mounting assembly components 10 additionally include a lower fuel tank mounting bracket 42 (see FIG. 1), which in the present embodiment is a steel stamping (as shown, the stamping is substantially symmetrical about a vertical axis) and provides addition support of the fuel tank 8 relative to the crankcase 4. In the present embodiment, the lower fuel tank mounting bracket 42 is fastened to the fuel tank 8 with two screws 44 (see FIG. 2) that respectively extend through two orifices 43 in the mounting bracket (one of which is shown in FIG. 1) and into the two additional holes 13 along the underside of the fuel tank 8, such that the mounting bracket is securely sandwiched between heads of the two screws and the fuel tank. Additionally, the lower fuel tank mounting bracket 42 is fastened to the crankcase 4 by way of an additional bolt 45 (see FIG. 1) that extends through an additional orifice 47 in the mounting bracket and into a corresponding hole 51 (see FIG. 2) in the crankcase.

The overall manner of assembly of the fuel tank 8 relative to the crankcase 4 by way of the mounting assembly components 10 serves both to fasten the fuel tank to the crankcase as well as to constrain their relative motion. In particular, the upper fuel tank mounting bracket 20 serves to constrain two axes of linear motion and rotation in one plane. Additionally, the lower fuel tank mounting bracket 42 serves to constrain the location of the fuel tank 8 relative to the engine crankcase 4 (particularly by preventing rotation on a plane parallel to that defined by the axes of the tapered posts 22, 24), so as to avoid interference with other engine components such as decorative covers, linkages, etc., which among other things could be exacerbated or exaggerated by engine shaking forces.

The mounting assembly components 10 and fuel tank 8 are engineered to limit total crush of the fuel tank when assembled together. The rubber grommets 28 are never fully collapsed nor are they free from interference with the tank, such that they are always in contact with the tank and are a dampening mechanism to engine vibration (generating shaking forces). The primary bracket portion 26 also defines a functional open area or space 40 in the middle area of its span between the tapered posts 22, 24. The open area 40 serves to provide a vent path for cool air to flow from the engine cooling fan (which is not shown, but which is typically located on the crankshaft above the crankcase 4) through the bracket and to and along the engine crankcase 4.

The fuel tank 8 in the present embodiment is blow-molded, and in particular is blow-molded to include compression limiting features to prevent the tank from being crushed and damaged. While it is typical for injection-molded fuel tanks to have fuel filtration screens that are welded directly onto the fuel tank well surface, this is not typically the case with blow-molded fuel tanks, which instead typically use external fuel filters that are spliced into the fuel hose that feeds the carburetor. In the present embodiment, rather than employ such a spliced external fuel filter, the fuel tank 8 is designed to include a fuel tank outlet spud or nipple 54 (see FIG. 2) that is large enough to utilize a long and slim cylindrical filter 56 to fit inside the outlet spud. Since this filter is inserted into the spud from the outside of the fuel tank, the filter is a serviceable, replaceable fuel tank component that can be implemented without a two-piece fuel hose and two-additional hose clamps that are typical of in-line fuel hose filtration methods.

Embodiments of the present invention can provide one or more of a variety of advantages. In particular, in at least some embodiments, the present invention provides a fuel tank system assembly with high structural integrity that is capable of supporting four times the weight of the overall engine (e.g., up to 128 lb-force). This allows for optimization of the packaging of engines on shipping pallets, which often requires that the engines rest on and be supported by the fuel tank (rather than vice-versa). Use of a single-piece, blow-molded design for the fuel tank in particular is advantageous relative to the use of a fuel tank formed from multiple pieces that are welded together. Indeed, not only does the absence of a weld seam serve to strengthen the fuel tank, but also it enhances the durability of the fuel tank from the standpoint of avoiding possible leakage along the weld seam that could possibly occur over time due to chemical attack from the fuel (e.g., due to alcohol found in gasoline).

Also, in the embodiment described above, the fuel tank 8 and mounting assembly components 10 allow for the fuel tank to be attached to the crankcase 4 without modification, and allow for the fuel tank to be used to replace previously designed fuel tanks (e.g., as an aftermarket component). Further, the fuel tank 8 and major mounting assembly components (e.g., the upper and lower fuel tank mounting brackets 20, 42) are engineered so as to allow assembly of the fuel tank relative to the crankcase 4 without any specific order of assembly being required, thus, providing flexibility in terms of engine manufacturing process. That is, the mounting brackets 20, 42 can be assembled to the crankcase 4 first and then subsequently to the fuel tank 8, or vice-versa (or even potentially by assembling the mounting brackets to both the crankcase and the fuel tank substantially simultaneously). Also, it is possible that one of the mounting brackets 20, 42 can be affixed first to the fuel tank while the other is affixed first to the engine crankcase, and subsequently that each respective mounting bracket can then be affixed to the other of the fuel tank/engine crankcase to which it still needs to be connected.

The fuel tank 8 and mounting assembly components 10 in the present embodiment are also engineered such that the frequencies at which the fuel tank can vibrate (e.g., the modal frequencies) are substantially above those generated by the engine during operation. For example, assuming a standard maximum engine operational frequency of 60 Hz (corresponding to 3600 rpm), the fuel tank 8 can be designed to have a first modal frequency at a minimum of about two times that frequency or 150 Hz. Thus, vibrations caused by engine operation are unlikely to produce undesirable vibrations of the fuel tank 8 and mounting assembly components 10 at their natural frequencies. Further, in the present embodiment, the fuel tank 8 is engineered to provide finger protection with respect to rotating engine components without the need for any additional components to provide this function, as is often the case with conventional fuel tank assemblies. As noted above, in the present embodiment, the upper fuel tank mounting bracket 20 is configured to provide a pathway for cooling air generated by the engine fan to communicate with the crankcase 4.

A variety of additional embodiments of the present invention are also intended to be encompassed herein in addition to those described above. For example, in at least one additional embodiment, it is possible for the number of tapered holes/tapered posts to be other than two as shown above (e.g., only one of each can be present, or more than two can be present). Also, the number and types of fastening components used can vary considerably depending upon the embodiment. Also, in at least some embodiments, the tapered posts need not extend all of the way through the fuel tank (that is, need not extend the entire length or substantially the entire length of the tapered holes), but rather only need extend part of the way.

Further, in at least some embodiments, it is possible that posts (or, indeed, the bolts) extending into the fuel tank from the outboard side of the fuel tank (opposite the inboard side along which the mounting bracket(s) are positioned) can be the components that extend partly, substantially or entirely through the fuel tank. In at least some such embodiments, such posts or other structures also could be tapered (albeit the tapering would typically proceed in a manner opposite to that described above). Additionally, depending upon the type of engine with respect to which the fuel tank is to be mounted, the arrangement and characteristics of the fuel tank can vary in other manners. For example, in at least some embodiments where the fuel tank is to be mounted upon a horizontal crankshaft engine, the tapered holes/channels can pass vertically through the fuel tank rather than horizontally as shown in FIG. 1 (albeit depending upon the embodiment, tapered holes/channels can proceed in any given direction, and any number of tapered holes/channels can be employed).

Although the above description occasionally utilizes terms suggestive of a physical orientation of components relative to the ground or some other reference point (e.g., horizontal/vertical), the present invention is intended to encompass a wide variety of embodiments of engines and fuel tank systems having fuel tanks, mounting assembly components, and/or other components arranged in any of a variety of manners and the use of these terms is not intended to restrict applicability of the invention to embodiments having particular physical orientations relative to ground or any other reference.

It is specifically intended that the present invention not be limited to the embodiments and illustrations contained herein, but include modified forms of those embodiments including portions of the embodiments and combinations of elements of different embodiments as come within the scope of the following claims.

I claim:

1. A fuel tank system comprising:
   a fuel tank including an outer wall that defines an internal cavity, an input orifice by which fuel can be added to the fuel tank, and first and second channels extending between first and second opposed outer surfaces of the wall through the cavity;
   a first mounting bracket having first and second protrusions, wherein a first surface of the mounting bracket is positioned proximate the first opposed outer surface of the fuel tank, and wherein the first and second protrusions respectively extend into the first and second channels, respectively;

first and second fastening devices that are positioned proximate the second opposed outer surface of the fuel tank and that are respectively fastened to the first and second protrusions, respectively, so as to prevent movement of the first and second protrusions out of the first and second channels, thereby securing the mounting bracket to the fuel tank; and at least one additional fastening device by which the mounting bracket is secured to an other engine component.

2. The fuel tank system of claim 1, wherein the fuel tank is manufactured by way of at least one of a blow-molding process, an injection molding process, and a twin sheet hot forming process.

3. The fuel tank system of claim 2, wherein the fuel tank is a single piece body including a fuel tank neck, aside from a fuel tank cap that can be affixed to the fuel tank neck.

4. The fuel tank system of claim 1, wherein the first and second fastening devices include first and second bolts, respectively, that are configured to extend into and be secured with respect to first and second threaded holes formed within the first and second protrusions, respectively.

5. The fuel tank system of claim 4, wherein the first and second bolts include first and second heads that at least indirectly apply force to the second opposed outer surface of the fuel tank when the bolts are secured with respect to the threaded holes.

6. The fuel tank system of claim 5, wherein the first and second fastening devices include at least first and second washers, wherein the first and second washers are positioned within cavities formed along the second opposed outer surface of the fuel tank between the second opposed outer surface and the respective heads of the respective bolts.

7. The fuel tank system of claim 6, wherein the first and second fastening devices include at least third and fourth washers, wherein the first and second washers are plastic and the third and fourth washers are metallic.

8. The fuel tank system of claim 1, wherein first and second rubberized grommets are positioned within first and second cavities formed within the first opposed outer surface of the fuel tank, so that the grommets are positioned between the first opposed outer surface and the mounting bracket when the mounting bracket is secured to the fuel tank.

9. The fuel tank of claim 8, wherein the rubberized grommets are neither fully collapsed nor free from interference with the fuel tank when the mounting bracket is secured to the fuel tank.

10. The fuel tank system of claim 1, further comprising an additional mounting bracket that is additionally secured to the fuel tank and is secured at least indirectly to the other engine component.

11. The fuel tank system of claim 10, wherein the first mounting bracket is manufactured from at least one of diecast aluminum and injection molded thermoplastic, and wherein the additional mounting bracket is a steel stamping.

12. The fuel tank system of claim 10, wherein the mounting brackets both restrict linear movement of the fuel tank relative to the other engine component in relation to two linear motion axes and also restrict rotational movement of the fuel tank relative to the other engine component about a single plane.

13. The fuel tank system of claim 1, wherein the first and second protrusions are tapered tubes in which a tapering is such that a diameter of the tubes becomes smaller as one moves away from a main body of the mounting bracket, and wherein the first and second channels have a complementary tapering such that the first and second protrusions fit snugly within the first and second channels when the mounting bracket is secured relative to the fuel tank.

14. The fuel tank system of claim 1, wherein the fuel tank, mounting bracket, and fastening devices are configured to limit a crushing force applied to the fuel tank when the fuel tank is secured to the mounting bracket and to the other engine component.

15. The fuel tank system of claim 1, further comprising one or both of (i) means for allowing air from an engine fan to flow toward at least a portion of the other engine component, the means being part of the mounting bracket, and (ii) a fuel tank outlet spud and a filter element that fits inside of the outlet spud.

16. An internal combustion engine comprising the fuel tank system of claim 1.

17. The internal combustion engine of claim 16, wherein the internal combustion engine is a single-cylinder, vertical crankshaft internal combustion engine.

18. A method of assembling a fuel tank to an other component of an internal combustion engine, the method comprising:

assembling a first mounting bracket to one of the fuel tank and the other component, and assembling the first mounting bracket to the other of the fuel tank and the other component, wherein the assembling of the first mounting bracket to the fuel tank further comprises:

(a) inserting first and second protrusions of the first mounting bracket into first and second complementary holes extending through the fuel tank from a first opposed outer surface of the fuel tank to a second opposed outer surface of the fuel tank, thereby extending through a cavity formed within the fuel tank, wherein a main body of the first mounting bracket is positioned along the first opposed outer surface of the fuel tank; and (b) affixing at least one fastening device to the first and second protrusions proximate the second opposed outer surface of the fuel tank, whereby the first mounting bracket is thereby assembled to the fuel tank.

19. The method of claim 18, wherein the assembling of the first mounting bracket to the fuel tank further includes securing a second mounting bracket to the fuel tank and to the other engine component, and further comprising performing one of a blow-molding process, an injection molding process, and a twin sheet hot forming process to form the fuel tank.

20. An internal combustion engine comprising:

a crankcase;

a fuel tank including an outer wall that defines an internal cavity and first and second channels extending between first and second opposed outer surfaces of the wall through the cavity; and a plurality of mounting components by which the fuel tank is assembled to the crankcase, wherein the mounting components include a first mounting bracket having first and second protrusions, wherein the first and second protrusions respectively extend into the first and second channels, respectively, and first, second and third fastening devices, wherein the first and second fastening devices are respectively fastened to the first and second protrusions, respectively, so as to prevent movement of the first and second protrusions out of the first and second channels, and wherein the third fastening device secures the mounting bracket at least indirectly to the crankcase.

* * * * *